(12) United States Patent
Sayyarrodsari et al.

(10) Patent No.: US 7,184,845 B2
(45) Date of Patent: Feb. 27, 2007

(54) SYSTEM AND METHOD OF APPLYING ADAPTIVE CONTROL TO THE CONTROL OF PARTICLE ACCELERATORS WITH VARYING DYNAMICS BEHAVIORAL CHARACTERISTICS USING A NONLINEAR MODEL PREDICTIVE CONTROL TECHNOLOGY

(75) Inventors: Bijan Sayyarrodsari, Austin, TX (US); Eric Hartman, Austin, TX (US); Celso Axelrud, Round Rock, TX (US); Kadir Liano, Austin, TX (US)

(73) Assignee: Pavilion Technologies, Inc., Austin, TX (US)

( * ) Notice: Subject to any disclaimer, the term of this patent is extended or adjusted under 35 U.S.C. 154(b) by 380 days.

(21) Appl. No.: 10/731,596

(22) Filed: Dec. 9, 2003

(65) Prior Publication Data
US 2004/0130276 A1    Jul. 8, 2004

Related U.S. Application Data

(60) Provisional application No. 60/431,821, filed on Dec. 9, 2002.

(51) Int. Cl.
  *G05B 13/02*    (2006.01)
(52) U.S. Cl. ..................... 700/31
(58) Field of Classification Search ............ 700/28–31, 700/44, 48, 47, 37, 39, 46, 269, 273, 288, 700/65, 72
See application file for complete search history.

(56) References Cited

U.S. PATENT DOCUMENTS

| | | | | |
|---|---|---|---|---|
| 3,965,434 A | * | 6/1976 | Helgesson | 315/500 |
| 4,329,654 A | * | 5/1982 | Chamberlain | 315/500 |
| 5,098,276 A | * | 3/1992 | Jarabak et al. | 425/150 |
| 5,933,345 A | | 8/1999 | Martin et al. | |
| 6,047,221 A | | 4/2000 | Piche et al. | |
| 6,278,899 B1 | | 8/2001 | Piche et al. | |
| 6,381,504 B1 | | 4/2002 | Havener et al. | |
| 6,487,459 B1 | | 11/2002 | Martin et al. | |
| 6,738,677 B2 | | 5/2004 | Martin et al. | |
| 2004/0117040 A1 | | 6/2004 | Sayyarrodsari et al. | |

FOREIGN PATENT DOCUMENTS

JP      07192900 A   *   7/1995

* cited by examiner

*Primary Examiner*—Thomas Pham
(74) *Attorney, Agent, or Firm*—Meyertons Hood Kivlin Kowert & Goetzel, P.C.; Jeffrey C. Hood

(57) ABSTRACT

The present invention provides a method for controlling nonlinear control problems within particle accelerators. This method involves first utilizing software tools to identify variable inputs and controlled variables associated with the particle accelerator, wherein at least one variable input parameter is a controlled variable. This software tool is further operable to determine relationships between the variable inputs and controlled variables. A control system that provides variable inputs to and acts on controller outputs from the software tools tunes one or more manipulated variables to achieve a desired controlled variable, which in the case of a particle accelerator may be realized as a more efficient collision.

32 Claims, 9 Drawing Sheets

An electron and positron (antielectron) colliding at high energy, can annihilate to produce B⁰ and B̄⁰ mesons via a virtual Z boson or a virtual photon.

Two protons colliding at high energy can produce various hadrons plus very high mass particles such as Z bosons. Events such as this one are rare but can yield vital clues to the structure of matter.

$e^+e^- \rightarrow B^0 \bar{B}^0$

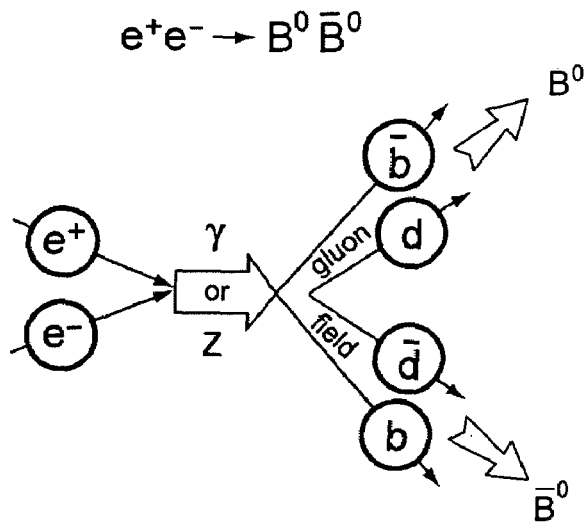

An electron and positron (antielectron) colliding at high energy, can annihilate to produce $B^0$ and $\bar{B}^0$ mesons via a virtual Z boson or a virtual photon.

*FIG. 1A*

$p\,p \rightarrow Z^0 Z^0$ + assorted hadrons

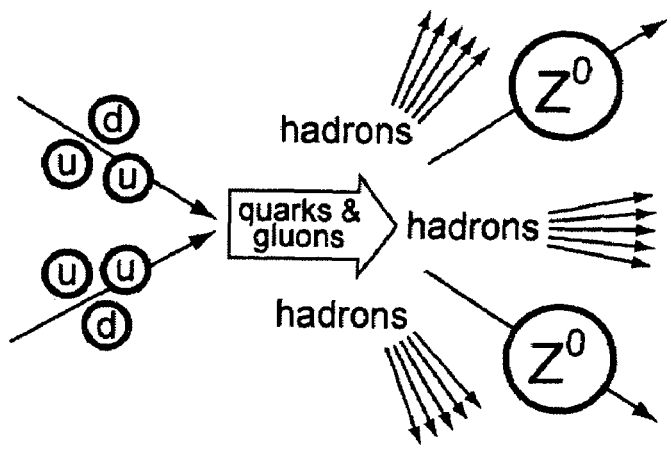

Two protons colliding at high energy can produce various hadrons plus very high mass particles such as Z bosons. Events such as this one are rare but can yield vital clues to the structure of matter.

*FIG. 1B*

SYSTEM AND METHOD OF APPLYING ADAPTIVE CONTROL TO THE CONTROL OF PARTICLE ACCELERATORS WITH VARYING DYNAMICS BEHAVIORAL CHARACTERISTICS USING A NONLINEAR MODEL PREDICTIVE CONTROL TECHNOLOGY

TECHNICAL FIELD OF THE INVENTION

This application claims benefit of priority to U.S. provisional application Ser. No. 60/431,821, titled "System and Method of Adaptive Control of Processes With Varying Dynamics," filed Dec. 9, 2002, whose inventors were Bijan Sayyarrodsari, Eric Hartman, Celso Axelrud, and Kadir Liano.

BACKGROUND OF THE INVENTION

The study of fundamental particles and their interactions seeks to answer two questions: (1) what are the fundamental building blocks (smallest) from which all matter is made; and (2) what are the interactions between these particles that govern how the particles combine and decay? To answer these questions, physicist use accelerators to provide high energy to subatomic particles, which then collide with targets. Out of these interactions come many other subatomic particles that pass into detectors. FIGS. 1A and 1B illustrate typical collisions or interactions used in this study. From the information gathered in the detectors, physicists can determine properties of the particles and their interactions.

In these experiments, subatomic particles collide. However, to achieve the desired experiments requires a large degree of control over the particles trajectory and the environment in which the collisions actually take place. Process and control models are typically used to aid the physicist in the setup and execution of these experiments.

Process Models used for prediction, control, and optimization can be divided into two general categories, steady state models and dynamic models. These models are mathematical constructs that characterize the process, and process measurements are often utilized to build these mathematical constructs in a way that the model replicates the behavior of the process. These models can then be used for prediction, optimization, and control of the process.

Many modern process control systems use steady-state or static models. These models often capture the information contained in large amounts of data, wherein this data typically contains steady-state information at many different operating conditions. In general, the steady-state model is a non-linear model wherein the process input variables are represented by the vector U that is processed through the model to output the dependent variable Y. The non-linear steady-state model is a phenomenological or empirical model that is developed utilizing several ordered pairs ($U_i$, $Y_i$) of data from different measured steady states. If a model is represented as:

$$Y = P(U, Y) \quad (1)$$

where P is an appropriate static mapping, then the steady-state modeling procedure can be presented as:

$$M(\overline{U}, \overline{Y}) \rightarrow P \quad (2)$$

where U and Y are vectors containing the $U_i$, $Y_i$ ordered pair elements. Given the model P, then the steady-state process gain can be calculated as:

$$K = \frac{\Delta P(u, y)}{\Delta u} \quad (3)$$

The steady-state model, therefore, represents the process measurements taken when the process is in a "static" mode. These measurements do not account for process behavior under non-steady-state condition (e.g. when the process is perturbed, or when process transitions from one steady-state condition to another steady-state condition). It should be noted that real world processes (e.g. particle accelerators, chemical plants) operate within an inherently dynamic environment. Hence steady-state models alone are, in general, not sufficient for prediction, optimization, and control of an inherently dynamic process.

A dynamic model is typically a model obtained from non-steady-state process measurements. These non-steady-state process measurements are often obtained as the process transitions from one steady-state condition to another. In this procedure, process inputs (manipulated and/or disturbance variables denoted by vector u(t)), applied to a process affect process outputs (controlled variables denoted by vector y(t)), that are being output and measured. Again, ordered pairs of measured data ($u(t_i)$, $y(t_i)$) represent a phenomenological or empirical model, wherein in this instance data comes from non-steady-state operation. The dynamic model is represented as:

$$y(t) = p(u(t), u(t-1), \ldots, u(t-M), y(t), y(t-1), \ldots, y(t-N)) \quad (4)$$

where p is an appropriate mapping. M and N specify the input and output history that is required to build the dynamic model.

The state-space description of a dynamic system is equivalent to input/output description in Equation (4) for appropriately chosen M and N values, and hence the description in Equation (4) encompasses state-space description of the dynamic systems/processes as well.

Nonlinear dynamic systems are in general difficult to build. Prior art includes a variety of model structures in which a nonlinear static model and a linear dynamic model are combined in order to represent a nonlinear dynamic system. Examples include Hammerstein models (where a static nonlinear model precedes a linear dynamic model in a series connection), and Wiener models (where a linear dynamic model precedes a static nonlinear model in a series connection). U.S. Pat. No. 5,933,345 constructs a nonlinear dynamic model in which the nonlinear model respects the nonlinear static mapping captured by a neural network.

SUMMARY

This invention extends the state of the art by developing a neural network that is trained to produce the variation in parameters of a dynamic model that can best approximate the dynamic mapping in Equation (4), and then utilizing the overall input/output static mapping (also captured with a neural network trained according to the description in paragraph [0005]) to construct a parsimonious nonlinear dynamic model appropriate for prediction, optimization, and control of the process it models.

In most real-world applications, first-principles (FPs) models (FPMs) describe (fully or partially) the laws governing the behavior of the process. Often, certain parameters in the model critically affect the way that model behaves. Hence, the design of a successful control system depends heavily on the accuracy of the identified parameters. This invention develops a parametric structure for the nonlinear dynamic model that represents the process (see Equation (6)). To fulfill online modeling system goals, neural networks (NNs) models (NNMs) have been developed to robustly identify the variation in the parameters of this dynamic model, when the operation region changes considerably (see FIG. 7). The training methodology developed can also be used to robustly train parametric steady-state models.

Numerous ways of combining NNMs and FPMs exist. NNMs and FPMs can be combined "in parallel". Here the NNMs the errors of the FPMs, then add the outputs of the NNM and the FPM together. This invention uses a combination of the empirical model and parametric physical models in order to model a nonlinear process with varying dynamics.

NNMs and FPMs represent two different methods of mathematical modeling. NNMs are empirical methods for doing nonlinear (or linear) regression (i.e., fitting a model to data). FPMs are physical models based on known physical relationships. The line between these two methods is not absolute. For example, FPMs virtually always have "parameters" which must be fit to data. In many FPMs, these parameters are not in reality constants, but vary across the range of the model's possible operation. If a single point of operation is selected and the model's parameters are fitted at that point, then the model's accuracy degrades as the model is used farther and farther away from that point. Sometimes multiple FPMs are fitted at a number of different points, and the model closest to the current operating point is used as the current model.

NNMs and FPMs each have their own set of strengths and weaknesses. NNMs typically are more accurate near a single operating point while FPMs provide better extrapolation results when used at an operating point distant from where the model's parameters were fitted. This is because NNMs contain the idiosyncrasies of the process being modeled. These sets of strengths and weaknesses are highly complementary—where one method is weak the other is strong—and hence, combining the two methods can yield models that are superior in all aspects to either method alone. This is applicable to the control of processes where dynamic behavior of the process displays significant variations over the operation range of the process.

The present invention provides an innovative approach to building parametric nonlinear models that are computationally efficient representations of both steady-state and dynamic behavior of a process over its entire operation region. For example, the present invention provides a system and method for controlling nonlinear control problems within particle accelerators. This method involves first utilizing software tools to identify input variables and controlled variables associated with the operating process to be controlled, wherein at least one input variable is a manipulated variable. This software tool is further operable to determine relationships between the input variables and controlled variables. A control system that provides inputs to and acts on inputs from the software tools tunes one or more model parameters to ensure a desired behavior for one or more controlled variables, which in the case of a particle accelerator may be realized as a more efficient collision.

The present invention may determine relationships between input variables and controlled variables based on a combination of physical models and empirical data. This invention uses the information from physical models to robustly construct the parameter varying model of FIG. 7 in a variety of ways that includes but is not limited to generating data from the physical models, using physical models as constraints in training of the neural networks, and analytically approximating the physical model with a model of the type described in Equation (6).

The parametric nonlinear model of FIG. (7) can be augmented with a parallel, neural networks that models the residual error of the series model. The parallel neural network can be trained in a variety of ways that includes concurrent training with the series neural network model, independent training from the series neural networks model, or iterative training procedure.

The neural networks utilized in this case may be trained according to any number of known methods. These methods include both gradient-based methods, such as back propagation and gradient-based nonlinear programming (NLP) solvers (for example sequential quadratic programming, generalized reduced gradient methods), and non-gradient methods. Gradient-based methods typically require gradients of an error with respect to a weight and bias obtained by either numerical derivatives or analytical derivatives.

In the application of the present invention to a particle accelerator, controlled variables such as but not limited to varying magnetic field strength, shape, location and/or orientation are controlled by adjusting corrector magnets and/or quadrupole magnets to manipulate particle beam positions within the accelerator so as to achieve more efficient interactions between particles.

Another embodiment of the present invention takes the form of a system for controlling nonlinear control problems within particle accelerators. This system includes a distributed control system used to operate the particle accelerator. The distributed control system further includes computing device(s) operable to execute a first software tool that identifies input variables and controlled variables associated with the given control problem in particle accelerator, wherein at least one input variable is a manipulated variable. The software tool is further operable to determine relationships between the input variables and controlled variables. Input/output controllers (IOCs) operate to monitor input variables and tune the previously identified control variable(s) to achieve a desired behavior in the controlled variable(s).

The physical model in FIG. 7 is shown as a function of the input variables. It is implied that if variation of a parameter in the dynamic model is a function of one or more output variables of the process, then the said output variables are treated as inputs to the neural-network model. The relationship between the input variables and the parameters in the parametric model may be expressed through the use of empirical methods, such as but not limited to neural networks.

Specific embodiments of the present invention may utilize IOCs associated with corrector magnets and/or quadruple magnets to control magnetic field strength, shape, location and/or orientation and in order to achieve a desired particle trajectory or interaction within the particle accelerator.

Yet another embodiment of the present invention provides a dynamic controller for controlling the operation of a particle accelerator by predicting a change in the dynamic input values to effect a change in the output of the particle accelerator from a current output value at a first time to a different and desired output value at a second time in order to achieve more efficient collisions between particles. This dynamic controller includes a dynamic predictive model for receiving the current input value, wherein the dynamic predictive model changes dependent upon the input value, and the desired output value. This allows the dynamic predictive model to produce desired controlled input values at different time positions between the first time and the second time so as to define a dynamic operation path of the particle accelerator between the current output value and the desired output value at the second time. An optimizer optimizes the operation of the dynamic controller over the different time positions from the first time to the second time in accordance with a predetermined optimization method that optimizes the objectives of the dynamic controller to achieve a desired path from the first time to the second time, such that the objectives of the dynamic predictive model from the first time to the second time vary as a function of time.

A dynamic forward model operates to receive input values at each of time positions and maps the input values to components of the dynamic predictive model associated with the received input values in order to provide a predicted dynamic output value. An error generator compares the predicted dynamic output value to the desired output value and generates a primary error value as the difference for each of the time positions. An error minimization device determines a change in the input value to minimize the primary error value output by the error generator. A summation device for summing said determined input change value with an original input value, which original input value comprises the input value before the determined change therein, for each time position to provide a future input value as a summed input value. A controller operates the error minimization device to operate under control of the optimizer to minimize said primary error value in accordance with the predetermined optimization method.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 1A and 1B illustrate typical collisions or interactions studied with particle accelerators;

DETAILED DESCRIPTION OF THE INVENTION

Figure 2:
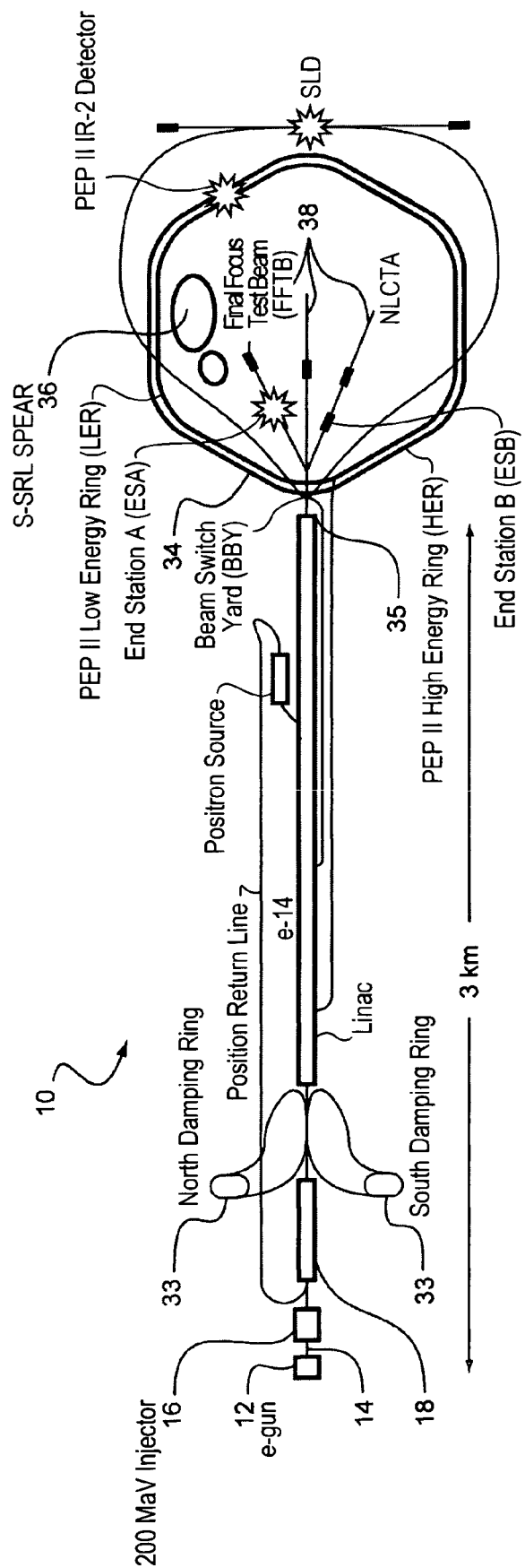
FIG. 2 depicts the components of a particle accelerator operated and controlled according to the system and method of the present invention.

Preferred embodiments of the present invention are illustrated in the FIGUREs, like numerals being used to refer to like and corresponding parts of the various drawings.

The present invention provides methodologies for the computationally efficient modeling of processes with varying dynamics. More specifically, the present invention provides a method for robust implementation of indirect adaptive control techniques in problems with varying dynamics through transparent adaptation of the parameters of the process model that is used for prediction and online optimization. Such problems include but are not limited to the control of: particle trajectories within particle accelerators, temperature in a chemical reactors, and grade transition in a polymer manufacturing process.

This innovation enables improvement of existing control software, such as Pavilion Technology's Process Perfecter®, to exert effective control in problems with even severely varying dynamics. This is especially well suited for the control of particle trajectories within accelerators.

The parametric nonlinear model introduced in this invention has been successfully used by inventors to model severely nonlinear processes. One specific application directly relates to the control of the linear accelerator at Stanford Linear Accelerator Center (SLAC).

The present invention provides a powerful tool for the analysis of the nonlinear relationship between the manipulated/disturbance variables and the controlled variables such as those at the Stanford Positron Electron Asymmetric Ring (SPEAR). Tuning of the control variables can benefit from this analysis. SLAC performs and supports world-class research in high-energy physics, particle astrophysics and disciplines using synchrotron radiation. To achieve this it is necessary to provide accelerators, detectors, instrumentation, and support for national and international research programs in particle physics and scientific disciplines that use synchrotron radiation. The present invention plays a key role in advances within the art of accelerators, and accelerator-related technologies and devices specifically and generally to all advanced modeling and control of operating processes—particularly those that exhibit sever nonlinear behavior that vary over time.

Accelerators such as those at SLAC provide high energy to subatomic particles, which then collide with targets. Out of these interactions come many other subatomic particles that pass into detectors. From the information gathered in the detector, physicists determine properties of the particles and their interactions.

The higher the energy of the accelerated particles, the more fully the structure of matter may be understood. For that reason a major goal is to produce higher and higher particle energies. Hence, improved control systems are required to ensure the particles strike their targets as designed within the experiment.

Particle accelerators come in two designs, linear and circular (synchrotron). The accelerator at SLAC is a linear accelerator. The longer a linear accelerator is, the higher the energy of the particles it can produce. A synchrotron achieves high energy by circulating particles many times before they hit their targets.

The components of a particle accelerator 10 are illustrated in FIG. 2. At the leftmost end of FIG. 2 is electron gun 12, which produces the electrons 14 to be accelerated. Any filament that is heated by an electrical current flowing through the filament releases electrons. Electric field 16 then accelerates electrons 14 towards the beginning of accelerator 18.

Figure 3:
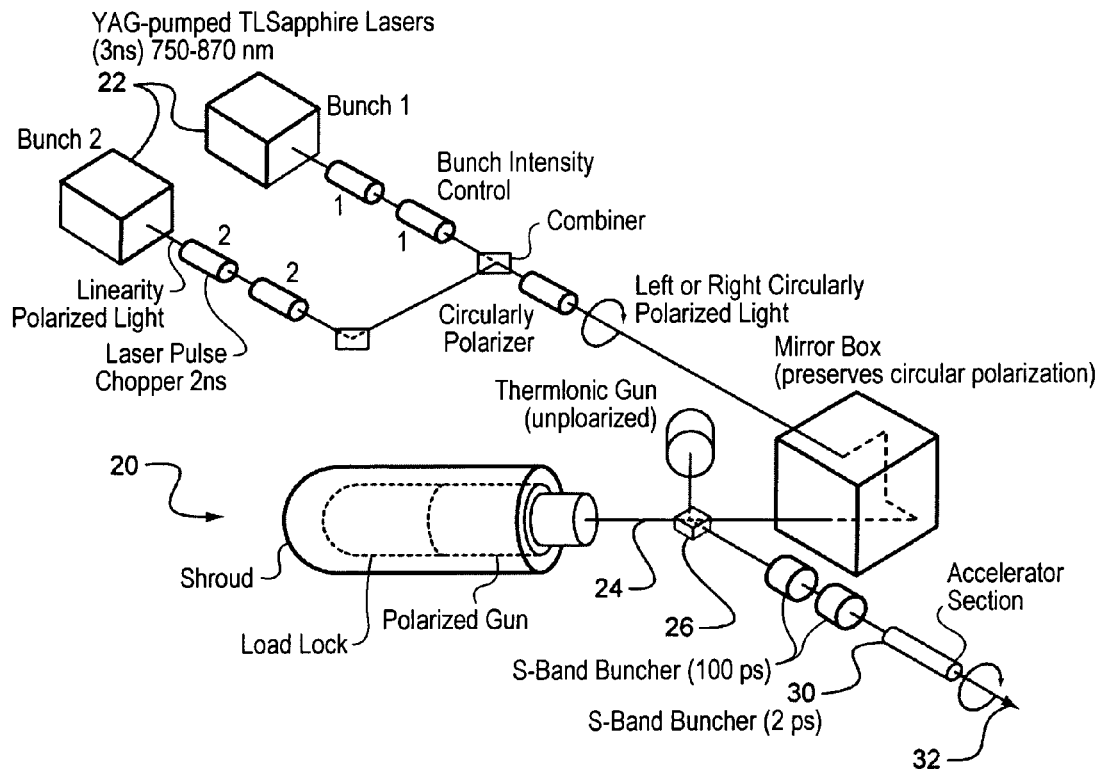
FIG. 3 illustrates a polarized electron gun associated with a particle accelerator operated and controlled according to the system and method of the present invention.

Alternatively, a polarized electron gun 20, as shown in FIG. 3, may be used. Here polarized laser light from laser sources 22 knocks electrons 24 off the surface of semiconductor 26. Electric field 30 then accelerates the electrons toward accelerator pipe 32. Polarized electron gun 20 must be kept at an extremely high vacuum, even higher than that of the accelerator itself. Such a vacuum may be on the order of $10^{-12}$ Tor.

Returning to FIG. 2, after the first few feet of the linear accelerator 18, the electrons 14 are traveling in bunches with an energy of approximately 10 MeV$^G$. This means that electrons 14 have reached 99.9% the speed of light. These bunches of electrons 14 have a tendency to spread out in the directions perpendicular to their travel.

Because a spread-out beam gives fewer collisions than a narrowly focused one, the electron and positron bunches are sent into damping rings 33 (electrons to north, positrons to south). These are small storage rings located on either side of the main accelerator. As the bunches circulate in damping rings 33, electrons 14 lose energy by synchrotron radiation and are reaccelerated each time they pass through a cavity fed with electric and magnetic fields. The synchrotron radiation decreases the motion in any direction, while the cavity reaccelerates only those in the desired direction. Thus, the bunch of electrons or positrons becomes increasingly parallel in motion as the radiation "damps out" motion in the unwanted directions. The bunches are then returned to accelerator 18 to gain more energy as travel within it. Further focusing is achieved with a quadrupole magnet or corrector magnet 16 in beamlines. Focusing here is achieved in one plane while defocusing occurs in the other.

Bunches of electrons 14 are accelerated within accelerator 18 in much the same way a surfer is pushed along a wave. The electromagnetic waves that push the electrons in accelerator 18 are created by high-energy microwaves. These microwaves emit from klystrons (not shown) and feed into the particle accelerator structure via waveguides to create a pattern of electric and magnetic fields.

Inside accelerator 18, the microwaves from the klystrons set up currents that cause oscillating electric fields pointing along accelerator 18 as well as oscillating magnetic fields in a circle around the accelerator pipe. Electrons and positrons at the end of the linear accelerator 10 enter the Beam Switch Yard (BSY) 34. Here the electrons are diverted in different directions by powerful dipole magnets 35 or corrector magnets 35 and travel into storage rings 36, such as SPEAR, or into other experimental facilities or beamlines 38. To efficiently operate accelerator 10 operators constantly monitor all aspects of it.

The challenge to efficiently operate accelerator 10 includes controlling temperature changes that cause the metal accelerator structure to expand or contract. This expansion changes the frequency of the microwave resonance of the structure. Hence, the particle accelerator structure is preferably maintained at a steady temperature, throughout. The cooling system/process should be monitored to ensure all parts are working. Vacuum should also be maintained throughout the entire klystron waveguide, and accelerating structure. Any tiny vacuum leak interferes with accelerator function. The entire system is pumped out to $\frac{1}{100,000,000,000}$ of atmospheric pressure. Further, the timing of the phase of each klystron must be correct, so that the entire structure, fed by numerous klystrons carries a traveling wave with no phase mismatches. Operators also monitor and focus the beam at many points along the accelerator. They use a variety of devices to monitor the beam such as strip beam position monitors (BPMs) and beam spot displays. Magnetic fields are typically used to focus the beams.

After subatomic particles have been produced by colliding electrons and positrons, the subatomic particles must be tracked and identified. A particle can be fully identified when its charge and its mass are known.

In principle the mass of a particle can be calculated from its momentum and either its speed or its energy. However, for a particle moving close to the speed of light any small uncertainty in momentum or energy makes it difficult to determine its mass from these two, so it is necessary to measure speed as well.

Figure 4:
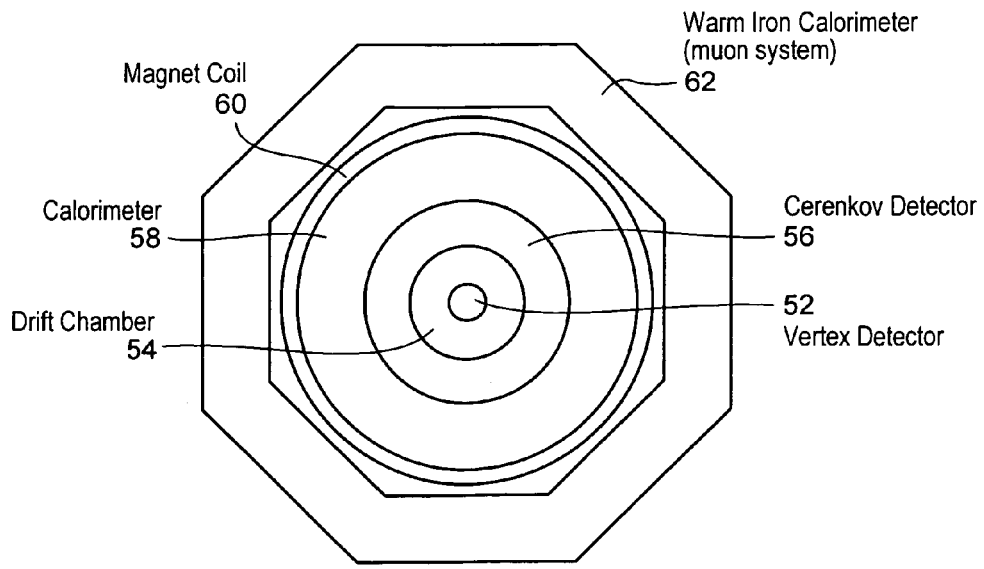
FIG. 4 depicts a multi-layer detector associated with a particle accelerator operated and controlled according to the system and method of the present invention.

A multi-layer detector as shown in FIG. 4 is used to identify particles. Each layer gives different information about the collision or interaction. Computer calculations based on the information from all the layers reconstruct the positions of particle tracks and identify the momentum, energy, and speed of as many as possible of the particles produced in the event.

FIG. 4 provides a cutaway schematic that shows all detector 50 elements installed inside a steel barrel and end caps. Complete detector may weigh as much as 4,000 tons and stands six stories tall. Innermost layer 52, the vertex detector, provides the most accurate information on the position of the tracks following collisions. The next layer, drift chamber 54, detects the positions of charged particles at several points along the track. The curvature of the track in the magnetic field reveals the particle's momentum. The middle layer, Cerenkov detector 56, measures particle velocity. The next layer, liquid argon calorimeter 58, stops most of the particles and measures their energy. This is the first layer that records neutral particles.

A large magnetic coil 60 separates the calorimeter and the outermost layer 62. The outermost layer comprises magnet iron and warm iron calorimeter used to detect muons.

The carefully controlled collisions within SLAC allow physicist to determine the fundamental (smallest) building blocks from which all matter is made and the interactions between the fundamental building blocks that govern how they combine and decay.

The deployment of control solutions at SLAC further requires the development of device drivers that enable the adaptive control strategy with a nonlinear model predictive control technology to communicate to the distributed controls system (DCS) at SLAC and the installation of the adaptive control strategy with a nonlinear model predictive control technology at SLAC. The distributed control system at SLAC is also known as EPICS (Experimental Physics Industrial Control System).

EPICS includes a set of software tools and applications which provide a software infrastructure with which to operate devices within the particle accelerators such as connector or quadrupole magnets or other like devices used to influence particle trajectories. EPICS represents in this embodiment a distributed control system comprising numerous computers, networked together to allow communication between them and to provide control and feedback of the various parts of the device from a central room, or remotely over a network such as the internet.

Client/Server and Publish/Subscribe techniques allow communications between the various computers. These computers (Input/Output Controllers or IOCs) perform real-world I/O and local control tasks, and publish information to clients using network protocols that allow high bandwidth, soft real-time networking applications.

Such a distributed control system may be used extensively within the accelerator itself as well as by many of the experimental beamlines of SLAC. Numerous IOCs directly or indirectly control almost every aspect of the machine operation such as particle trajectories and environments, while workstations or servers in the control room provide higher-level control and operator interfaces to the systems/processes, perform data logging, archiving and analysis. Many IOCs can cause the accelerator to dump the beam when errors occur. In some cases a wrong output could damage equipment costing many thousands of dollars and days or even weeks to repair.

Architecturally, EPICS embodies the 'standard model' of distributed control system design. The most basic feature being that EPICS is fully distributed. Thus, EPICS requires no central device or software entity at any layer. This achieves the goals of easy scalability, or robustness (no single point of failure).

Figure 5:
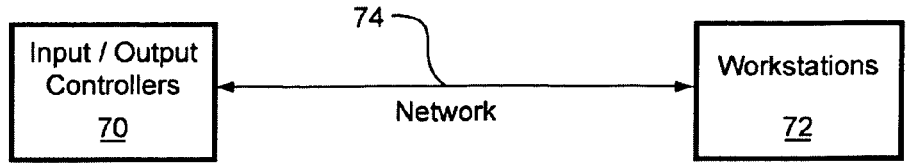
FIG. 5 depicts the three physical layers associated with a particle accelerator operated and controlled according to the system and method of the present invention.
Figure 6:
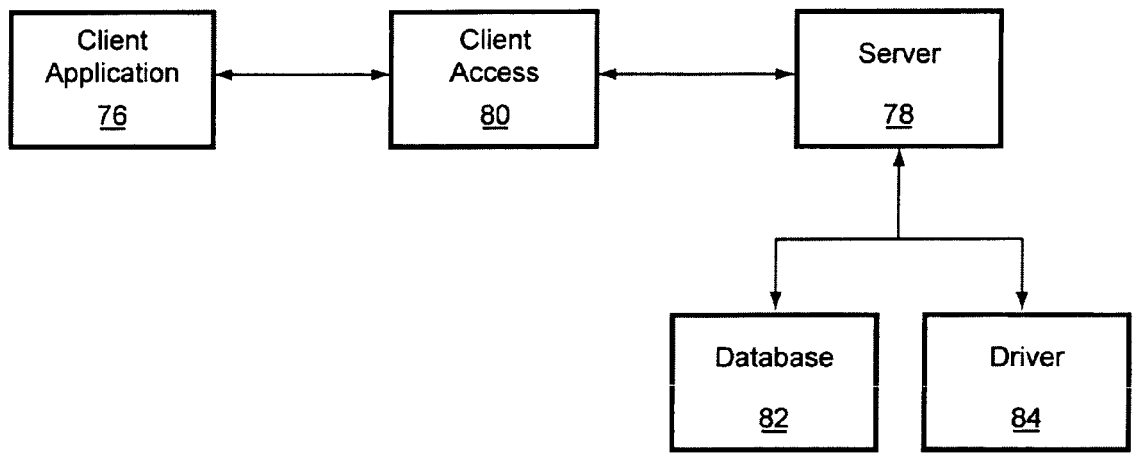
FIG. 6 depicts the five software layers associated with a particle accelerator operated and controlled according to the system and method of the present invention.

EPICS comprises three physical layers as shown in FIG. 5, and five software layers, as shown in FIG. 6. The physical front-end layer is as the 'Input/Output Controller' (IOC) 70. Physical back-end layer 72 is implemented on popular workstations running Unix, or on PC hardware running Windows NT or Linux. Layers 70 and 72 are connected by network layer 74, which is any combination of media (such as Ethernet, FDDI, ATM) and repeaters and bridges supporting the TCP/IP Internet protocol and some form of broadcast or multicast.

The software layers utilize the 'client-server' paradigm. Client layer 76 usually runs in backend or workstation physical layer 72 and represents the top software layer. Typical generic clients are operator control screens, alarm panels, and data archive/retrieval tools. These are all configured with simple text files or point-and-click drawing editors.

The second software layer that connects all clients 76 with all servers 78 is called 'channel access' (CA) 80. Channel access 80 forms the 'backbone' of EPICS and hides the details of the TCP/IP network from both clients 76 and servers 78. CA 80 also creates a very solid 'firewall' of independence between all clients and server code, so they can run on different processors. CA mediates different data representations.

The third software layer is the server layer 78. The fundamental server is the channel access server that runs on the target CPU embedded in every IOC. It insulates all clients from database layer 82. Server layer 78 cooperates with all channel access clients 76 to implement callback and synchronization mechanisms. Note that although clients 76 are typically independent host programs that call channel access 80 routines through a shared library, the channel access server is a unique distributed control task of the network nodes.

Database layer 82, is at the heart of the distributed control system. Using a host tool, the database is described in terms of function-block objects called 'records'. Record types exist for performing such chores as analog input and output; binary input and output; building histograms; storing waveforms; moving motors; performing calculations; implementing PID loops, emulating PALs, driving timing hardware; and other tasks. Records that deal with physical sensors provide a wide variety of scaling laws; allowing smoothing; provide for simulation; and accept independent hysteresis parameters for display, alarm, and archive needs.

Record activity is initiated in several ways: from I/O hardware interrupts; from software 'events' generated by clients 76 such as the Sequencer; when fields are changed from a 'put'; or using a variety of periodic scan rates. Records support a great variety of data linkage and flow control, such as sequential, parallel, and conditional. Data can flow from the hardware level up, or from the software level down. Records validate data passed through from hardware and other records as well as on internal criteria, and can initiate alarms for un-initialized, invalid, or out-of-tolerance conditions. Although all record parameters are generated with a configuration tool on a workstation, most may be dynamically updated by channel access clients, but with full data independence. The fifth, bottom of layer of software is the device driver layer 84 for individual devices.

This distributed control system implements the 'standard model' paradigm. This control system allows modularity, scalability, robustness, and high speed in hardware and software, yet remains largely vendor and hardware-independent.

The present invention provides a system and method of controlling particle collisions. To achieve this, specific algorithms have been developed that model and control the numerous variable associated with the linear accelerator at SLAC. Although the magnetic fields and their control have been specifically discussed here, it should be noted that these algorithms may be applied to any variable associated with these structures. Further, it should be noted that this methodology has application beyond the control of particle accelerators.

The development of parametric nonlinear models with potentially varying parameters contributes to the design of successful control strategies for highly nonlinear dynamic control problems. The activities associated with the present invention are divided into two categories. The first category includes all the activities involved in developing the algorithms enabling the use of parameter varying nonlinear models within nonlinear model predictive control technology embodied in one implementation as Process Perfecter®. The second category includes all the activities involved in facilitating the deployment of the said controller.

Figure 7:
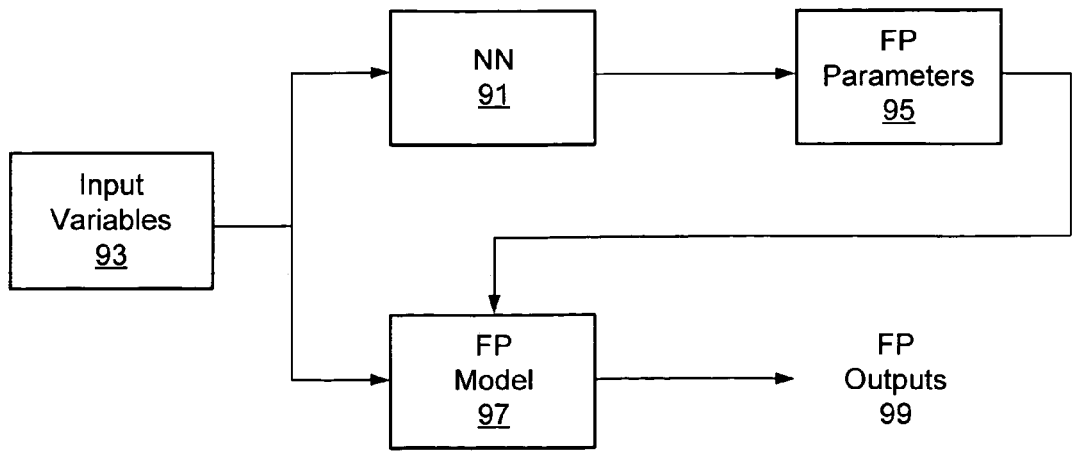
FIG. 7 illustrates the interaction between a neural network model and a parametric dynamic or static model.

The present invention treats all the variables upon which the current values of the varying parameters depend as inputs to the neural network model. This is illustrated in FIG. 7. A separate NN maps input variables 93 to the varying parameters 95. At runtime, the values of the current input variables feed into NN 91 and the correct current varying parameter values are produced as the NN model outputs. The parameters in parametric model 97 are then updated to take on these values. Thus, the NN and the parametric models are connected in series. The combined model will then have correct parameter values regardless of the operation region in which the system/process is operating.

The NN (its weights and biases) is trained as follows. The neural network is trained in the context of FIG. 7. The inputs to the combined model are the process variable inputs 93, the outputs of the combined model are the process variable outputs 99. Any method used to train a NN as known to those skilled in the art may be used to train the NN in this combined structure. Any gradient method (including back propagation or any gradient-based nonlinear programming (NLP) method, such as a Sequential Quadratic Programming (SQP), a Generalized Reduced Gradient (GRG) or other like method known to those skilled in the art) requires that the parametric model 97 be differentiable, while non-gradient methods do not impose this restriction.

Any gradient-based method requires the gradients of the error with respect to the weights and biases. These gradients can be readily obtained (assuming the models are differentiable) in either numerical or analytical derivatives. Numerical approximations to the derivatives are computed by making small changes to a weight/bias, observing the resulting process variable output, and then making one or more additional different and small change to the weight/bias, and again observing the FP output. An appropriate formula for first derivative approximation is then used.

The gradient of the error with respect to any of the NN weights and biases can be computed via the chain rule for derivatives. Hence, gradient-based methods require the Parametric model 97 to be differentiable.

The NN is trained without explicit targets for its own outputs. The NN outputs are in the same position in the combined model as are the hidden units in a NN—the errors for the NN outputs originate from the targets at the process variable output 99 level.

Any non-gradient method ordinarily requires that the process outputs 99 be computed as the first step, of and the chosen method's own evaluation of the goodness of the current state of the combined model is determined readily from any of the needed values within the combined model. Typically, non-gradient methods use error as the measure of goodness.

The present invention may utilize any parametric model structure whatsoever for the FP model block 97: steady state models, including those represented by open and by closed equations, and including whether or not the FP outputs are all separable to the left hand side of the equations or not, and whether or not all of the FP outputs are measured, as well as dynamic models, including IIR, FIR, difference equation, and differential equation models.

The methodology by which variation in process dynamics over different operation regimes is incorporated in the nonlinear model predictive control solution is described below. This invention's handling of systems with variable dynamics provides a commercially viable solution to a long-standing demand for robust adaptive control strategies in industry.

Significant applications exist in which dynamic behavior at the process varies considerably over the expected operation region. Examples range from polystyrene process and reactors with significant variation in the residence time, to acoustic systems/processes with temperature dependent acoustic properties, and supersonic airplanes operating over a wide range of mach numbers. As previously described, one embodiment of the present invention focuses on the application to the control of a linear accelerator. However, the present invention need not be so limited.

Relevant information regarding accurate description of the system/process dynamics under these circumstances can be found from a variety of resources. They include first-principles equations capturing functional dependency of dynamic parameters on input/output variables, operator knowledge, and empirical data rich enough to adequately represent changes in system/process dynamics.

The absence of a systematic way for handling varying process dynamics forces application engineers to devote significant energy and time so that the variations in process dynamics does not result in serious degradation of the controller performance. The present invention extends the existing formulations such that variations in process dynamics can be properly considered. This may result in improved input/output controller (IOC) performance as well as expanded operating conditions. The derivation of the proposed algorithm is based on the following general representation for the dynamics of the process as a nonlinear, possibly time-varying difference equation:

$$Y_K = F(u_k, u_{k-1}, \ldots, u_{k-M}, y_{k-1}, \ldots, y_{k-N}) \quad (5)$$

where $u_k$ is the vector of input variables affecting the process (i.e., both manipulated and disturbance variable inputs), $y_k$ is the vector of measured outputs, and F is a potentially time-varying nonlinear vector function.

In one embodiment, the present invention proposes the following perturbation model to locally approximate Equation (5):

$$\delta y_k = \sum_{i=1}^{N} \alpha_i(u_k u_{k-1}, \ldots, u_{k-M}, y_{k-1}, \ldots, y_{k-N})\delta y_{k-1} + \sum_{i=1}^{M} \beta_i(u_k u_{k-1}, \ldots, u_{k-M}, y_{k-1}, \ldots, y_{k-N})\delta y_{k-1} \quad (6)$$

where the coefficients $\alpha(.)$ and $\beta(.)$ can be defined as:

$$\alpha_i(u_k u_{k-1}, \ldots, u_{k-M}, y_{k-1}, \ldots, y_{k-N}) = \frac{\partial F}{\partial y_{k-i}} \quad (7)$$

and $$\beta_i(u_k u_{k-1}, \ldots, u_{k-M}, y_{k-1}, \ldots, y_{k-N}) = \frac{\partial F}{\partial u_{k-i}} \quad (8)$$

are functions of present and past inputs/outputs of the system. The methodology presented in this invention is applicable for higher order local approximations of the nonlinear function F. Also, as mentioned earlier, for a given state-space representation of a nonlinear parameter-varying system, an equivalent input/output model with the representation of Equation (5) can be constructed in a variety of ways known to experts in the field. Hence, the methodology presented here encompasses systems described in state-space as well. The approximation strategy captured by FIG. 7 is directly applicable to any functional mapping from an input space to output space, and hence the approach in this invention is directly applicable to state space description of the linear processes with varying dynamics.

This algorithm encompasses case where non-linearity in the parameters of the dynamic model (in addition to the gain) is explicitly represented.

The information regarding variation in dynamic parameters of the process can be directly incorporated in the controller design regardless of the source of the information about varying parameters.

The present invention may be applied whether complete or partial knowledge of the dynamic parameters is available. When full information regarding process dynamic parameters is available, $$\alpha_i(u_k u_{k-1}, \ldots, u_{k-M}, y_{k-1}, \ldots, y_{k-N}) = \frac{\partial F}{\partial y_{k-i}}$$

-continued and $$\beta_i(u_k u_{k-1}, \ldots, u_{k-M}, y_{k-1}, \ldots, y_{k-N}) = \frac{\partial F}{\partial u_{k-i}}$$

's in Equations. (6–8) are explicitly defined by the user. However, in the case of partial information, only some of the parameters are explicitly defined and the rest are found via an identification algorithm from empirical data.

Where second order models are used to describe the process, users most often provide information in terms of gains, time constants, damping factors, natural frequencies, and delays in the continuous time domain. The translation of these quantities to coefficients in a difference equation of the type shown in Equation (6) is straightforward and is given here for clarity:

For a system/process described as $$\frac{k}{(T\delta + 1)},$$

the difference equation based on ZOH discretization is:

$$\delta y_k = \left(e^{-\frac{T}{\tau}}\right)\delta y_{k-1} + k\left(1 - e^{-\frac{T}{\tau}}\right)\delta u_{k-1} \qquad (9)$$

For an over-damped system/process described as $$\frac{k(\tau_{lead}\varsigma + 1)}{(\tau_1\varsigma + 1)(\tau_2\varsigma + 1)}$$

the difference equation is:

$$\delta y_k = \left(e^{-\frac{T}{\tau_1}} + e^{-\frac{T}{\tau_2}}\right)\delta y_{k-1} - \left(e^{-\left(\frac{T}{\tau_1} + \frac{T}{\tau_2}\right)}\right)\delta y_{k-2} + \qquad (10)$$

$$\left(A\left(1 - e^{-\frac{T}{\tau_1}}\right) + B\left(1 - e^{-\frac{T}{\tau_2}}\right)\right)\delta u_{k-1} -$$

$$\left(Ae^{\frac{T}{\tau_2}}\left(1 - e^{-\frac{T}{\tau_1}}\right) + Be^{\frac{T}{\tau_1}}\left(1 - e^{-\frac{T}{\tau_2}}\right)\right)\delta u_{k-2}$$

where $$A = k\frac{\tau_1 - \tau_3}{\tau_1 - \tau_2}$$

$$B = k\frac{\tau_3 - \tau_2}{\tau_1 - \tau_2}.$$

and

For a system/process described as $$\frac{k(\tau_{lead}\varsigma + 1)}{(\tau\varsigma + 1)^2},$$

the difference equation is:

$$= \left(2e^{-\frac{T}{\tau}}\right)\delta y_{k-1} - \left(e^{-2\frac{T}{\tau}}\right)\delta y_{k-2} + \qquad (11)$$

$$\left(k - ke^{-\frac{T}{\tau}}\left(1 + \frac{T}{\tau} - \frac{\tau_{lead}T}{\tau^2}\right)\right)\delta u_{k-1} +$$

$$\left(ke^{-2\frac{T}{\tau}} - ke^{-\frac{T}{\tau}}\left(1 - \frac{T}{\tau} - \frac{\tau_{lead}T}{\tau^2}\right)\right)\delta u_{k-2}$$

For an under-damped system/process described as $$\frac{k(\tau_{lead}\delta + 1)}{\delta^2 + 2\frac{\xi}{\tau}\delta + \frac{1}{\tau^2}}$$

the difference equation is:

$$\delta y_k = \left(2e^{-\frac{\xi}{\tau}T}\cos\left(\frac{\sqrt{1-\xi^2}}{\tau}T\right)\right)\delta_{k-1} - \left(e^{-2\frac{\xi}{\tau}T}\right)\delta y_{k-2} + \qquad (12)$$

$$\left(\frac{G}{B}e^{-\frac{\xi}{\tau}T}\sin\left(\frac{\sqrt{1-\xi^2}}{\tau}T\right) + kA_1\right)\delta u_{k-1} +$$

$$\left(-\frac{G}{B}e^{-\frac{\xi}{\tau}T}\sin\left(\frac{\sqrt{1-\xi^2}}{\tau}T\right) + kA_2\right)\delta u_{k-2}$$

where $$G = \frac{k\tau_{lead}}{\tau^2}$$

$$B = \frac{\sqrt{1-\xi^2}}{\tau}$$

$$A_1 = 1 - e^{-\frac{\xi}{\tau}T}\cos\left(\frac{\sqrt{1-\xi^2}}{\tau}t\right) - \frac{\xi}{\sqrt{1-\xi^2}}E^{-\frac{\xi}{\tau}T}\sin\left(\frac{\sqrt{1-\xi^2}}{\tau}T\right),$$

and $$A_2 = e^{-\frac{\xi}{\tau}T} - e^{-\frac{\xi}{\tau}T}\cos\left(\frac{\sqrt{1-\xi^2}}{\tau}T\right) + \frac{\xi}{\sqrt{1-\xi^2}}e^{-\frac{\xi}{\tau}T}\sin\left(\frac{\sqrt{1-\xi^2}}{\tau}T\right).$$

The present invention accommodates user information whether there is an explicit functional description for the parameters of the dynamic model, or an empirical model is built to describe the variation, or just a tabular description of the variations of the parameters versus input/output values.

During optimization, the solver may access the available description for the variation of each parameter in order to generate relevant values of the parameter given the current and past values of the input(s)/output(s). Numerical efficiency of the computations may require approximations to the expressed functional variation of the parameters.

The present invention preserves the consistency of the steady-state neural network models and the dynamic model with varying dynamic parameters.

Using an approximation to the full dynamic model can simplify the implementation and speed up the execution frequency of the controller. The following details one such an approximation strategy. This invention, however, applies regardless of the approximation strategy that is adopted. Any approximation strategy known to those skilled in the art is therefore incorporate by reference in this disclosure.

The models may be updated when (a) changes in control problem setup occur (for example setpoint changes occur), or (b) when users specifically ask for a model update, or (c) when a certain number of control steps, defined by the users, are executed, or (d) an event triggers the update of the models.

Assuming that $(u_{init}, y_{init})$ is the current operating point of the system/process, and $y_{final}$, is the desired value of the output at the end of the control horizon, the present invention utilizes the steady state optimizer to obtain $u_{final}$ that corresponds to the desired output at the end of the control horizon.

The dynamic difference equation is formed at the initial and final points, by constructing the parameters of the dynamic model given the initial and final operation points, $(u_{init}, y_{init})$ and $(u_{final}, y_{final})$ respectively. Note that the functional dependency of the parameters of the dynamic model on the input/output values is well-defined (for example, user-defined, tabular, or an empirical model such as a NN.).

To approximate the difference equation during process's transition from initial operation point to its final operation point, one possibility is to vary the parameters affinely between their two terminal values. This choice is for ease of computation, and the application of any other approximation for the parameter values in between (including but not limited to higher order polynomials, sigmoid-type function, and tangent hyperbolic function) as is known to those skilled in the art may also be employed. To highlight the generality of the approach in this invention, the present invention may follow affine approximation of the functional dependency of parameters on input/output values is described here. Assume that p is a dynamic parameter of the system/process such as time constant, gain, damping, etc. Parameter p is a component of the FPM parameters 95 in FIG. 7. Also assume that $p=f(u_k, u_{k-1}, \ldots, u_{k-M}, y_{k-1}, \ldots, y_{k-N})$, where $f$ is an appropriate mapping. Note that with the assumption of steady state behavior at the two ends of the transition $u_k=u_{k-1}=\ldots=u_{k-M}$ and $y_{k-1}=y_{k-2}=\ldots=y_{k-N}$. An affine approximation for this parameter can be defined as follows:

$$p(u_k, u_{k-1}, y_{k-1}, y_{k-2}) = \quad (13)$$
$$p(u_{init}, y_{init}) + p_u\left(\frac{\partial p}{\partial u}\right)_{init}(u_k - u_{init}) + p_y\left(\frac{\partial p}{\partial u}\right)(y_k - y_{init})$$

where for simplicity M=N=2 is assumed.

When state space description of the process is available p may be a function of state as well. The methodology is applicable regardless of the functional dependency of p.

Note that the coefficients $p_u$ and $p_y$ are approximation factors and must be defined such that $p(u_{final}, y_{final})=f(u_{final}, y_{final})$, where the following substitutions are done for brevity: $u_k=u_{k-1}=\ldots=u_{k-M}=u_{final}$ and $y_{k-1}=\ldots=y_{k-N}=y_{final}$. The constraint on the final gain is not enough to uniquely define both $p_u$ and $p_y$. This present invention covers all possible selections for $p_u$ and $p_y$. One possible option with appropriate scaling, and proportionality concerns is the following:

$$p_u = \left(\frac{p_{final} - p_{init}}{u_{final} - u_{init}}\right) \frac{1}{\frac{\partial p}{\partial u} + \epsilon \frac{\partial p}{\partial y}} \quad (14)$$

$$p_y = \left(\frac{p_{final} - p_{init}}{y_{final} - y_{init}}\right) \frac{\epsilon}{\frac{\partial p}{\partial u} + \epsilon \frac{\partial p}{\partial y}} \quad (15)$$

where $0 \leq \epsilon \leq 1$ is a parameter provided by the user to determine how the contributions from variations in $u_k$ and $y_k$ must be weighted. By default $\epsilon$ is 1.

The quantities $$\frac{\partial p}{\partial u} \text{ and } \frac{\partial p}{\partial y}$$

can be provided in analytical forms by the user. In the absence of the analytical expressions for these quantities, they can be approximated. One possible approximation is $$\left(\frac{p_{final} - p_{init}}{u_{final} - u_{init}}\right) \text{ and } \left(\frac{p_{final} - p_{init}}{y_{final} - y_{init}}\right)$$

respectively.

To maintain the coherency of the user-provided information regarding dynamic behavior of the process, and the information captured by a steady-state neural network based on empirical data, an additional level of gain scheduling is considered in this invention. The methodology describing this gain scheduling is described in detail.

One possible approach for maintaining the consistency of the static nonlinear gain information with the dynamic model is described below. This invention however need not be limited to the approach described here.

1. The difference equation of the type described by Equation (6) is constructed. For example, the variable dynamics information on $\tau$, $\zeta$, lead time, etc. at the initial and final points will be translated into difference model in Equation (6) using Equations (9)–(12).
2. The overall gain at the initial and final point is designed to match that of the steady state neural network, or that of the externally-provided variable dynamics gain information:
   (a) From the static neural network the gains at each operation point, i.e.

$$\left(g_i^{ss} = \frac{dy}{du}\right)(u_{init}, y_{init}), \text{ and} \left(g_f^{ss} = \frac{dy}{du}\right)(u_{final}, y_{final}),$$

are extracted. User can also define the gain to be a varying parameter.
   (b) For simplicity of the presentation, a second order difference equation is considered here:

$$\delta y_k = -a_1(.)\delta y_{k-1} - a_2(.)\delta y_{k-2} + v_1 \delta u_{k-1-\Delta} + v_2 \delta u_{k-2-\Delta} + w_1$$
$$(u_{k-1} - u_{init})\delta u_{k-1-\Delta} + w_2(u_{k-2} - u_{init})\delta u_{k-2-\Delta} \quad (12)$$

where a1(.) and a2(.) can be constructed as follows:

$$a_1(.) = \left(a_1^i + (a_1^f - a_1^i)\frac{\bar{u}_{k-1} - u_{init}}{u_{final} - u_{init}}\right)$$

$$a_2(.) = \left(a_2^i + (a_2^f - a_2^i)\frac{\bar{u}_{k-2} - u_{init}}{u_{final} - u_{init}}\right)$$

where $a_1^i$, $a_1^f$, $a_2^i$, $a_2^f$, $b_1^i$, $b_1^f$, $b_2^i$, $b_2^f$ are determined using Equations (9)–(12).

$\bar{u}_{k-1}$ and $\bar{u}_{k-2}$ can be defined (but need not be limited to) the following:

$$\bar{u}_k = u_i + \frac{1}{2}(u_f - u_i)\left(1 + \frac{e^{k\frac{u_k - u_m}{u_r}} - e^{-k\frac{u_k - u_m}{u_r}}}{e^{k\frac{u_k - u_m}{u_r}} + e^{-k\frac{u_k - u_m}{u_r}}}\right)$$

where $$u_m = \frac{u_f + u_i}{2}; \quad u_r = \|u_f - u_i\|$$

and k is a parameter that controls how the transition from $u_i$ to $u_f$ will occur. If no varying parameter exists, then the initial and final values for these parameters will be the same.

(c) Parameters $v_1$, $v_2$, $w_1$, $w_2$ must then be defined such that the steady state gain of the dynamic system matches those extracted from the neural network at both sides of the transition region (or with the externally-provided gain information that is a part of variable dynamics description). One possible selection for the parameters is (but need not be limited to) the following:

$$v_1 = b_1^i \left(\frac{1 + a_1^i + a_2^i}{b_1^i + b_2^i}\right) g_{ss}^i$$

$$v_2 = b_2^i \left(\frac{1 + a_1^i + a_2^i}{b_1^i + b_2^i}\right) g_{ss}^i$$

(d) A possible selection for $w_1$ and $w_2$ parameters is (but need not be limited to) the following:

$$\omega_1 = \left(\frac{b_1^f}{b_1^f + b_2^f}\right)\left(\frac{1 + a_1^f + a_2^f}{u_{final} - u_{init}}\right) g_{ss}^f - \frac{v_1}{u_{final} - u_{init}}$$

$$\omega_2 = \left(\frac{b_2^f}{b_1^f + b_2^f}\right)\left(\frac{1 + a_1^f + a_2^f}{u_{final} - u_{init}}\right) g_{ss}^f - \frac{v_2}{u_{final} - u_{init}}$$

The present invention in one embodiment may be applied towards modeling and control at the linear accelerator at SLAC. The present invention further includes the development device drivers that enable communication between the Data Interface of the present invention (DI) and SLAC's EPICS that talks to the lower level Distributed Control System at SLAC.

Any communication between the hardware and a control system such as the one at SLAC is done through SLAC's EPICS system, and therefore, the present invention includes a reliable interface between the hardware and the control system.

Figure 8:
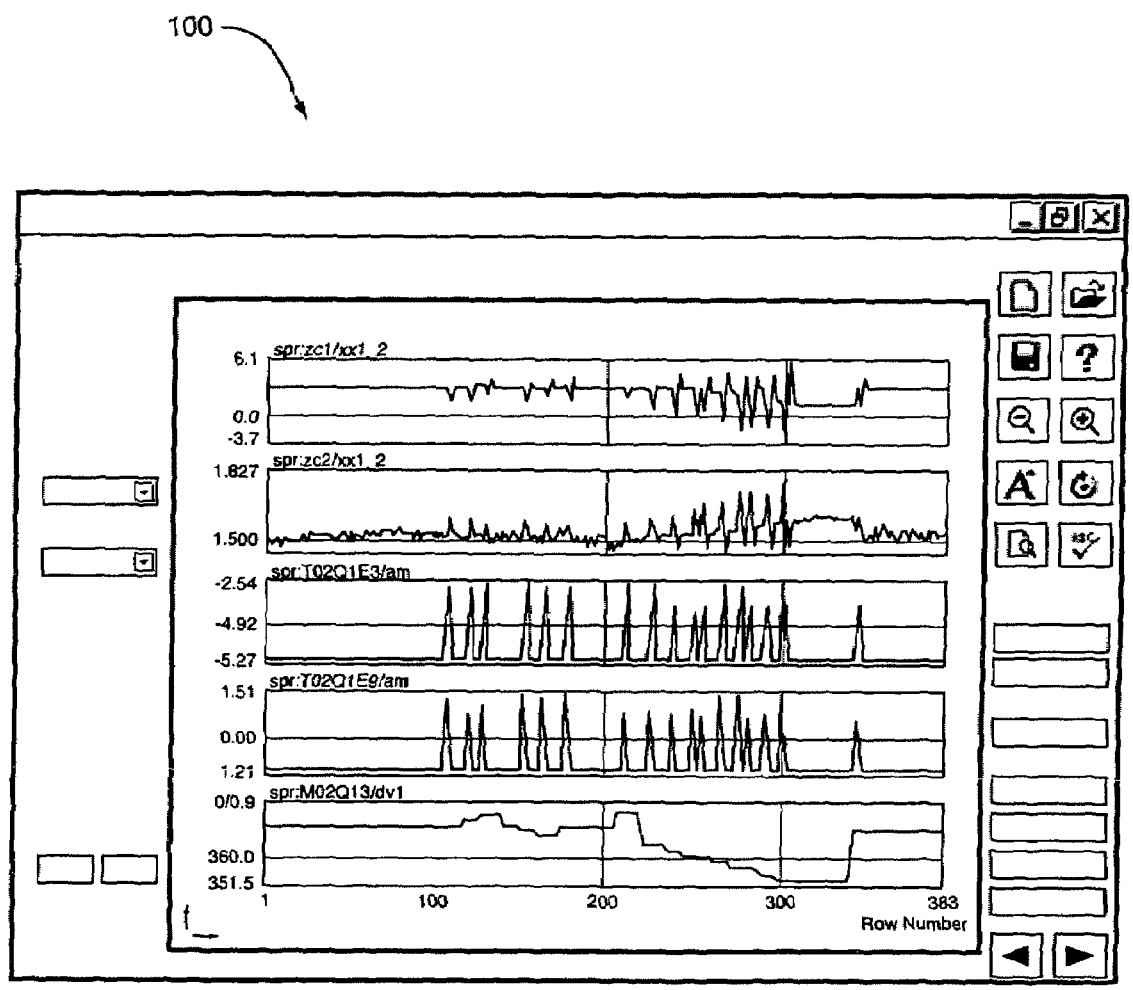
FIG. 8 provides a screenshot that evidences the clear correlation between the MVs with the BPM.
Figure 9:
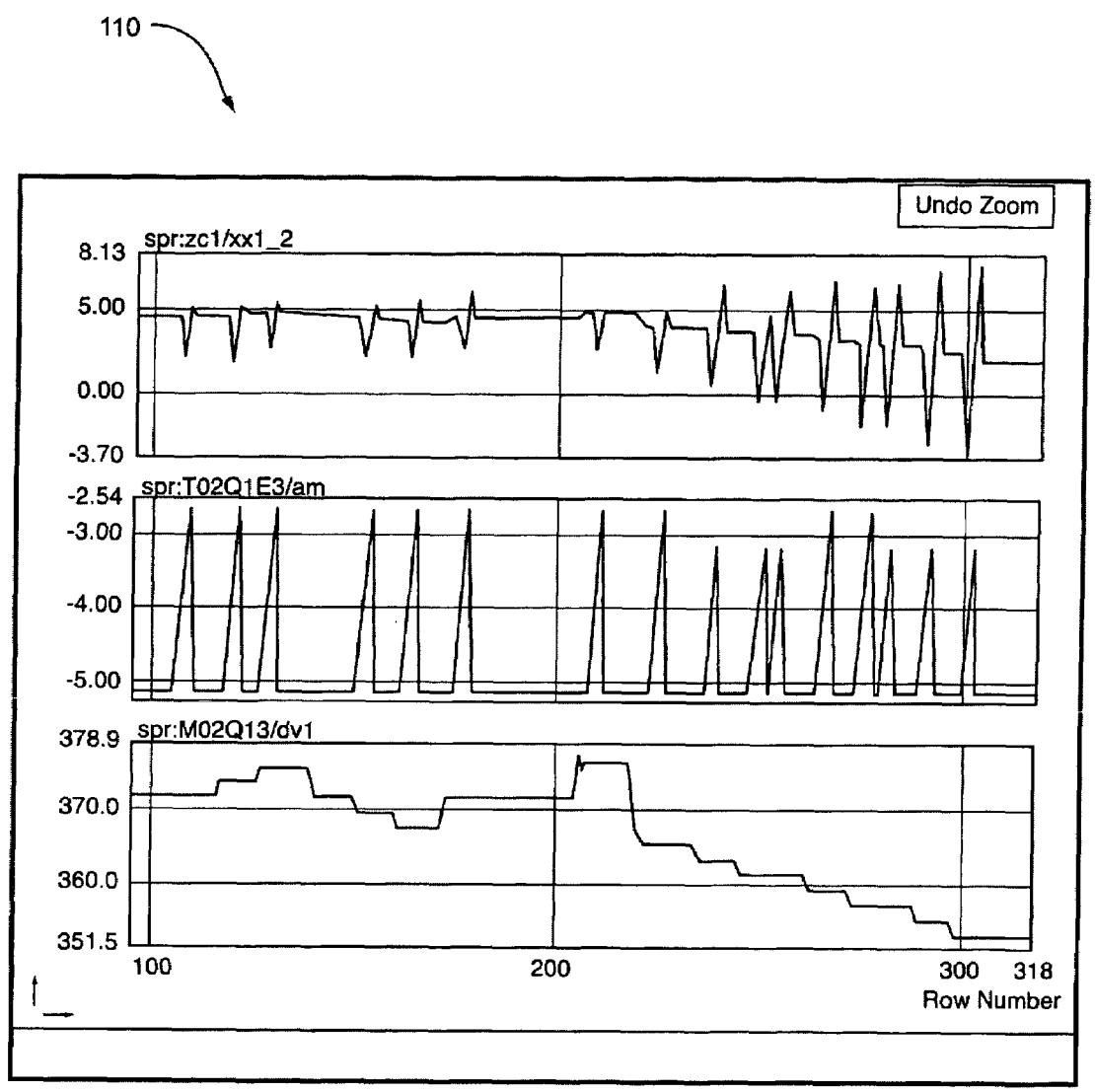
FIG. 9 provides yet another screenshot of the variation in variables.
Figure 10:
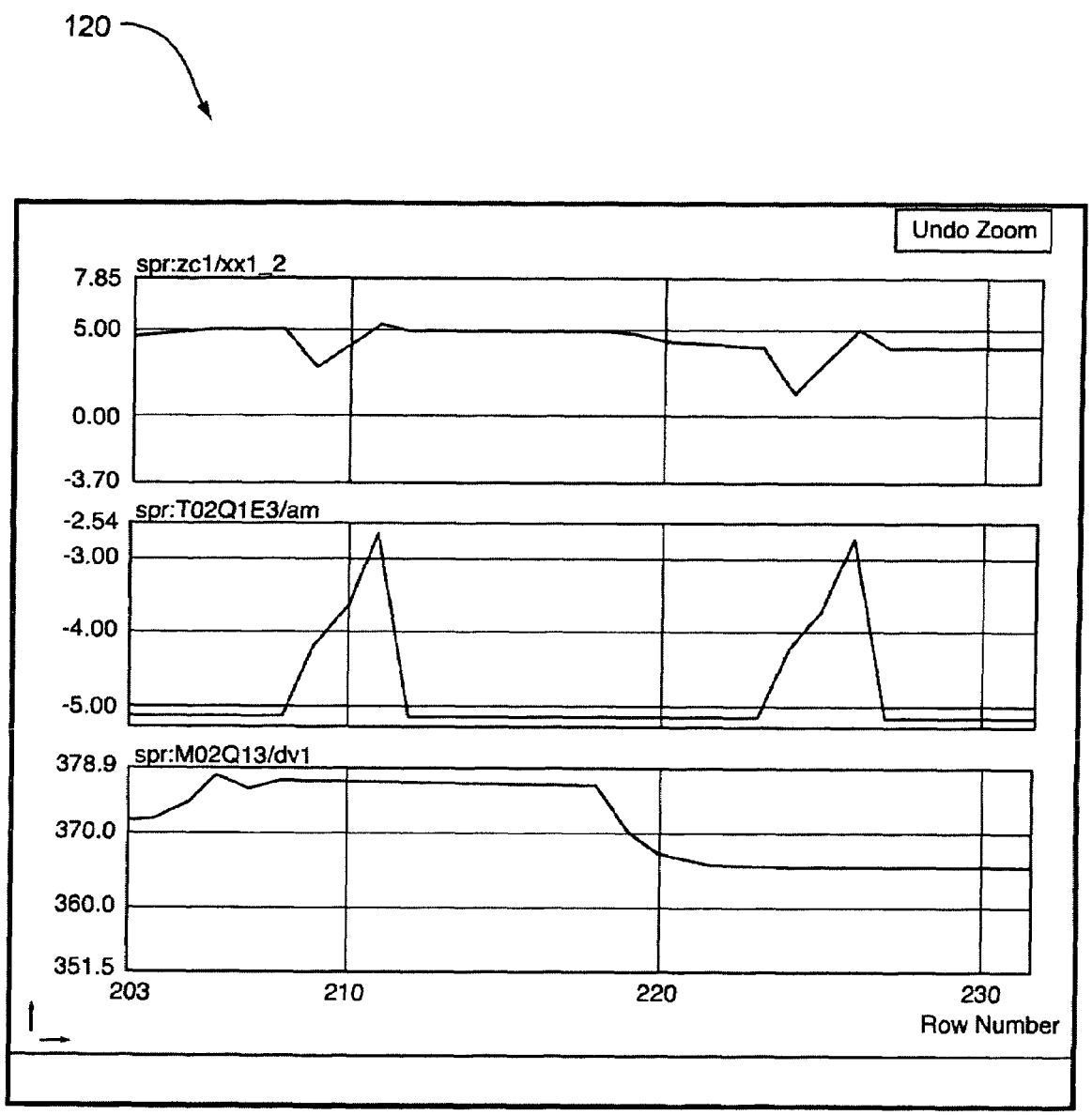
FIG. 10 provides yet another screen shot showing a capture of the input/output data.

The results from the modeling effort on the collected data on SPEAR II are summarized in FIGS. 8, 9, and 10. A quick look at the relevant data captured in the course of one experiment where three manipulated variables (MVs) were intentionally moved in the course of the experiments: two corrector magnets and one quadrupole magnet. The reading of Beam Position Monitors (BPMs) is recorded as the controlled variables (CVs) or output of this experiment.

Screen capture 100 of the input/output variables from the test data is provided in FIG. 8. Note that the x andy reading of one of the BPMs are chosen as CVs and the MVs are the ones mentioned earlier, the tag name for which is clearly indicated in the screen capture. FIG. 8 evidences the clear correlation between the MVs with the BPM. Another screen analytic is provided in FIG. 9 gives a better screenshot 110 of the variation in variables.

FIG. 10 provides yet another screen shot 120 where the dots 122 are actual data points. A model of the nonlinear input/output relationship was constructed using Pavilion's Perfecter®. Due to simultaneous variation in manipulated variables, the identification is rather difficult. Data is manipulated (by cutting certain regions of data) to make sure that the maximum accuracy in the identification of the input/output behavior is captured.

Figure 11:
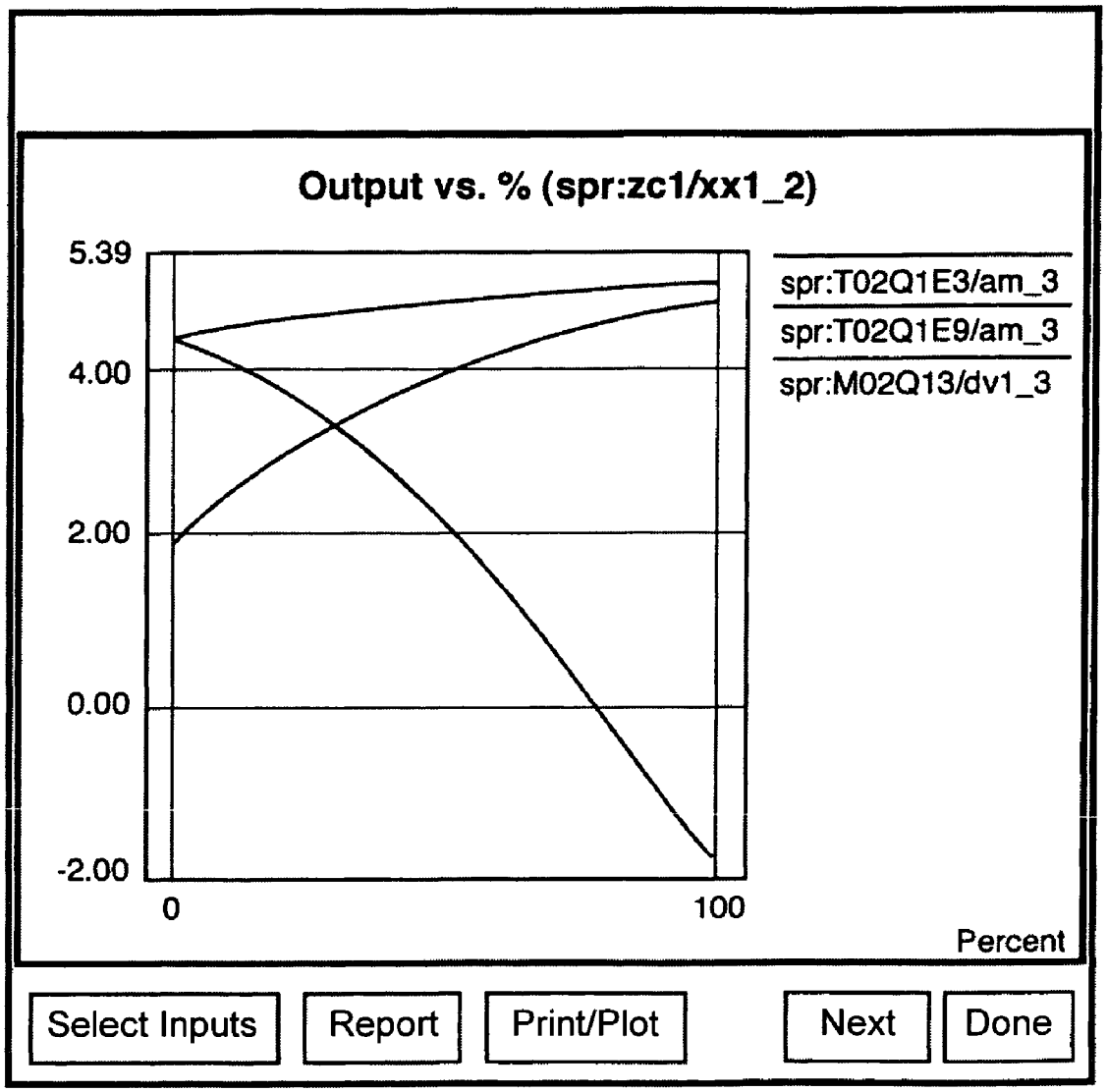
FIG. 11 displays one such input/output relationship for the SPEAR Equipment at SLAC.

FIG. 11 displays one such input/output relationship for the SPEAR Equipment at SLAC. This figure clearly shows the nonlinear input/output relationship in the above-mentioned model.

The present invention's capability in the design of new adaptive control algorithms, identification of processes with varying dynamics is clearly demonstrated. Further development efforts will improve the developed algorithms to a commercial quality code base.

In summary, the present invention provides a method for controlling nonlinear control problems in operating processes like a particle accelerator. The invention utilizes modeling tools to identify variable inputs and controlled variables associated with the process, wherein at least one variable input is a manipulated variable input. The modeling tools are further operable to determine relationships between the variable inputs and controlled variables. A control system that provides inputs to and acts on inputs from the modeling tools tunes one or more manipulated variables to achieve a desired controlled variable, which in the case of a particle accelerator may be realized as a more efficient collision.

Figure 12:
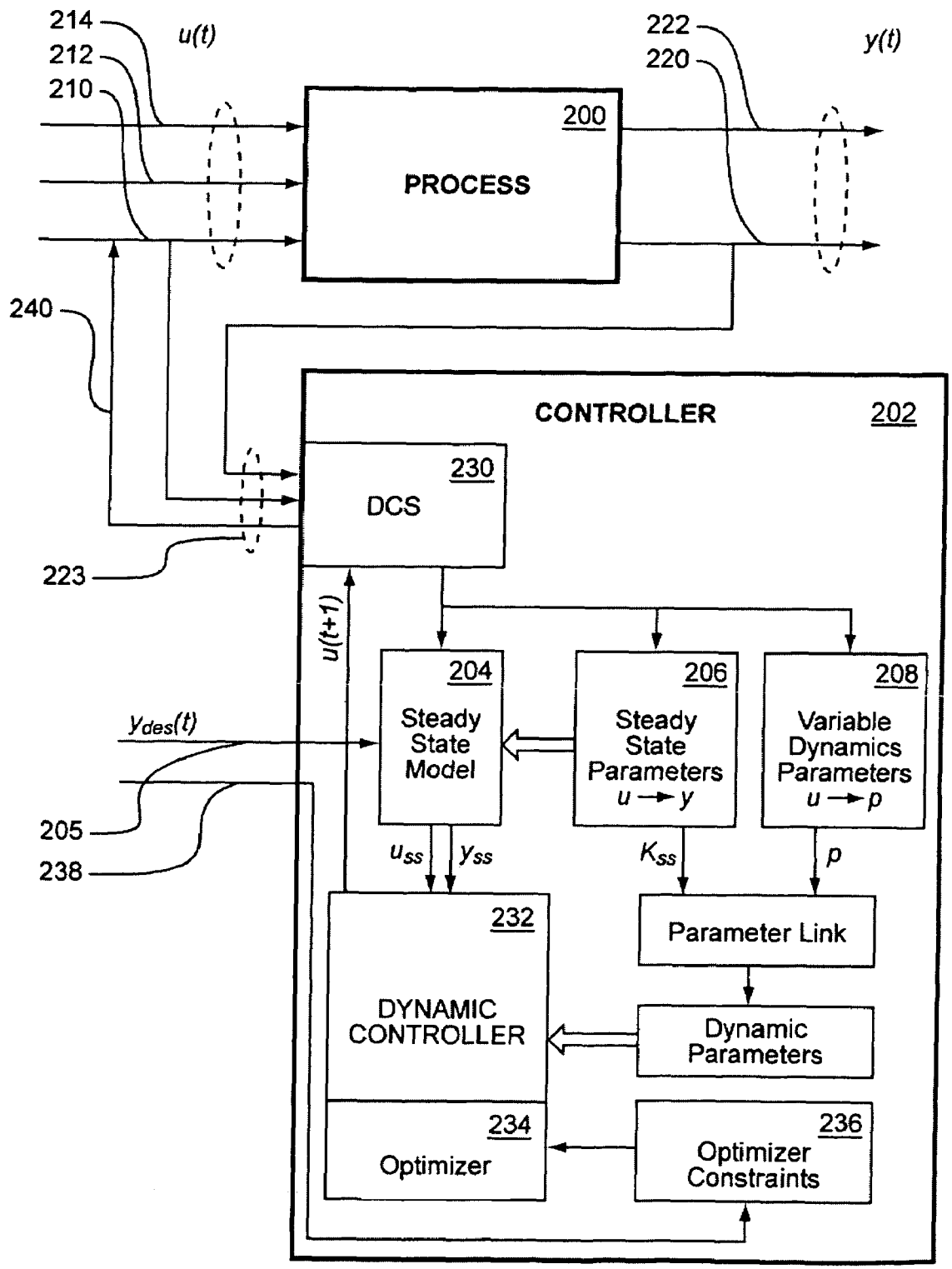
FIG. 12 illustrates the relationship of the various models in the controller and the controller and the process.

FIG. 12 provides another illustration of the relationship of the process 200 and the controller 202 and more importantly the relationship of the models 204, 206 and 208 within the controller 202 to the control of the process 200. A typical process has a variety of variable inputs u(t) some of these variables may be manipulated variable inputs 210 and some may be measured disturbance variables 212 and some may be unmeasured disturbance variables 214. A process 200 also typically has a plurality of variable outputs. Some are measurable and some are not. Some may be measurable in real-time 220 and some may not 222. Typically, a control system's objective is to control one of these process variable outputs. This variable is called the controlled variable. Additionally, to the controller the process variable outputs may be considered one of the variable inputs to the controller or controller variable inputs 223. Typically but not necessarily, a control system uses a distributed control system (DCS) 230 to manage the interactions between the controller 202 and the process 200—as illustrated in the embodiment in FIG. 12. In the embodiment shown the controller includes a steady state model 204 which can be a parameterized physical model of the process. This model can receive external input 205 comprised of the desired controlled variable values. This may or may not come from the operator or user (not shown) of the process/control system 202. Additionally the embodiment illustrates a steady state parameter model 206 that maps the variable inputs u to the variable output(s) y in the steady state model. Further, the embodiment illustrates a variable dynamics model 208 which maps the variable inputs u to the parameters p of the parameterized physical model of the process. In one embodiment of the invention empirical modeling tools, in this case NNs, are used for the Steady State parameter model and the variable dynamics parameter models. Based on input received from the process these models provide information to the dynamic controller 232 which can be optimized by the optimizer 234. The Optimizer is capable of receiving optimizer constraints 236 which may possibly receive partial or possibly total modification from an external source 238 which may or may not be the operator or user (not shown) of the process 200 or control system 202. Inputs 205 and 208 may come from sources other than the operator or user of the control system 202. The dynamic controller 232 provides the information to the DCS 230 which provides setpoints for the manipulated variable inputs 240 which is the output of the controller 240.

Although the particle accelerator example is described in great detail, the inventive modeling and control system described herein can be equally applied to other operating processes with comparable behavioral characteristics.

Although the present invention is described in detail, it should be understood that various changes, substitutions and alterations can be made hereto without departing from the spirit and scope of the invention as described by the appended claims.

What is claimed is:

1. A system for controlling particle accelerators, comprising:
   a distributed control system that further comprises: a computing device operable to execute a first software tool that identifies variable inputs and controlled variables associated with the particle accelerator, wherein at least one variable input is a manipulated variable input, wherein said manipulated variable comprises a magnetic field strength, shape, location and/or orientation and said controlled variables comprise particle positions within said particle accelerator, and wherein said first software tool is further operable to determine relationships between said variable inputs and said controlled variables; and
   at least one input/output controller operable to monitor said variable inputs and tune said manipulated variable to achieve a desired controlled variable value.

2. The system for controlling particle accelerators of claim 1, wherein said relationships between said variable input parameters and said controlled variables comprises a first principle models wherein said first principle model is dependent on said variable inputs.

3. The system for controlling particle accelerators of claim 1, further comprising neural networks utilized to identify said variable inputs.

4. The system for controlling within particle accelerators of claim 1, wherein said step of determining relationships between said variable inputs and said controlled variables utilizes a combination of physical models and empirical methods.

5. The system for controlling particle accelerators of claim 4, wherein said physical models and empirical methods are combined in series.

6. The system for controlling particle accelerators of claim 4, wherein said physical models and empirical methods are combined in parallel.

7. The system for controlling particle accelerators of claim 4, wherein said physical model varies over an operating range.

8. The system for controlling particle accelerators of claim 5, wherein said physical model is a function of said variable inputs.

9. The system for controlling particle accelerators of claim 7, wherein said physical model comprises first principle parameters which vary with said variable inputs, wherein empirical methods comprise a neural network used to identify first principle parameters values associated with said variable inputs, and wherein said neural network updates said first principle parameters with values associated with said variable inputs.

10. The system for controlling particle accelerators of claim 9, wherein said neural network is trained.

11. The system for controlling particle accelerators of claim 9, wherein said neural network is trained according to at least one method selected from the group consisting of: gradient methods, back propagation, gradient-based nonlinear programming methods, sequential quadratic programming, generalized reduced gradient methods, and non-gradient methods.

12. The system for controlling particle accelerators of claim 11, wherein gradient methods require gradients of an error with respect to a weight and bias obtained by numerical derivatives.

13. The system for controlling particle accelerators of claim 11, wherein gradient methods require gradients of an error with respect to a weight and bias obtained by analytical derivatives.

14. The system for controlling particle accelerators of claim 1, wherein said step of tuning said manipulated variable comprises adjusting a connector magnet and/or quadrupole magnet.

15. A dynamic controller for controlling the operation of a particle accelerator by predicting a change in the dynamic variable input values to the process to effect a change in the output of the particle accelerator from a current output value at a first time to a different and desired output value at a second time to achieve more efficient collisions between particles, comprising:
   a dynamic predictive model for receiving the current variable input value, wherein said dynamic predictive model changes dependent upon said input value, and the desired output value, and wherein said dynamic predictive model produces a plurality of desired controlled variable values at different time positions between the first time and the second time to define a dynamic operation path of the particle accelerator between the current output value and the desired output value at the second time, wherein said variable input value comprises a magnetic field strength, shape, location and/or orientation and said controlled variables comprise particle positions within said particle accelerator; and
   an optimizer for optimizing the operation of the dynamic controller over a plurality of the different time positions in accordance with a predetermined optimization method that optimizes the objectives of the dynamic controller to achieve a desired path, such that the objectives of the dynamic predictive model vary as a function of time.

16. The dynamic controller of claim 15, wherein said dynamic predictive model comprises:
- a dynamic forward model operable to receive variable input values at each of said time positions and map said variable input values to components of said dynamic predictive model associated with said received variable input values in order to provide a predicted dynamic output value; an error generator for comparing the predicted dynamic output value to the desired output value and generating a primary error value as the difference for each of said time positions;
- an error minimization device for determining a change in the variable input value to minimize the primary error value output by said error generator;
- a summation device for summing said determined variable input change value with an original variable input value, which original variable input value comprises the variable input value before the determined change therein, for a plurality of time position to provide a future variable input value as a summed variable input value; and
- a controller for controlling the operation of said error minimization device to operate under control of said optimizer to minimize said primary error value in accordance with said optimization method.

17. A method for controlling particle accelerators, comprising the steps of:
- identifying variable inputs and controlled variables associated with the particle accelerator, wherein at least one variable input parameter is a manipulated variables, wherein said manipulated variable comprises a magnetic field strength, shape, location and/or orientation and said controlled variables comprise particle positions within said particle accelerator;
- determining relationships between said variable inputs and said controlled variables wherein said relationship comprises models, and wherein parameters within said model are dependent on said variable inputs; and
- tuning said manipulated variable to achieve a desired controlled variable value.

18. The method of claim 17, wherein said step of identifying parameters utilizes neural networks to identify said parameters.

19. The method of claim 17, wherein said step of identifying parameters utilizes neural networks that identify said parameters when an operating region changes.

20. The method of claim 17, wherein said step of identifying parameters utilizes neural networks that identify said parameters.

21. The method of claim 17, wherein said step of determining relationships between said variable inputs and said controlled variables utilizes a combination of physical models and empirical methods.

22. The method of claim 21, wherein said physical models and empirical methods are combined in series.

23. The method of claim 21, wherein said physical models and empirical methods are combined in parallel.

24. The method of claim 21, wherein said physical model varies over an operating range.

25. The method of claim 24, wherein said physical model is a function of said variable inputs.

26. The method of claim 25, wherein said physical model comprises first principle parameters which vary with said variable inputs, wherein empirical methods comprise a neural network used to identify first principle parameter values associated with said variable inputs, and wherein said neural network updates said first principle parameters with values associated with said variable inputs.

27. The method of claim 26, wherein said neural network is trained.

28. The method of claim 27, wherein said neural network is trained according to at least one method selected from the group consisting of gradient methods, back propagation, gradient-based nonlinear programming (NLP) methods, sequential quadratic programming, generalized reduced gradient methods, and non-gradient methods.

29. The method of claim 28, wherein gradient methods require gradients of an error with respect to a weight and bias obtained by either numerical derivatives or analytical derivatives.

30. The method of claim 17, wherein said step of tuning said manipulated variable comprises adjusting a connector magnet.

31. The method of claim 17, wherein said step of tuning said manipulated variable comprises adjusting a quadrupole magnet.

32. The method of claim 17, wherein said step of tuning said manipulated variable comprises adjusting a connector magnet and quadrupole magnet.

* * * * *